United States Patent
Sun et al.

(10) Patent No.: US 11,016,212 B2
(45) Date of Patent: May 25, 2021

(54) COMPRESSING SEISMIC WAVEFIELDS IN THREE-DIMENSIONAL REVERSE TIME MIGRATION

(71) Applicant: Saudi Arabian Oil Company, Dhahran (SA)

(72) Inventors: BingBing Sun, Beijing (CN); Hongwei Liu, Al-Khobar (SA); Vincent Etienne, Abqaiq (SA); Xu Ji, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 92 days.

(21) Appl. No.: 15/949,826

(22) Filed: Apr. 10, 2018

(65) Prior Publication Data
US 2018/0292555 A1    Oct. 11, 2018

Related U.S. Application Data

(60) Provisional application No. 62/484,101, filed on Apr. 11, 2017.

(51) Int. Cl.
*G01V 1/34*    (2006.01)
*G06T 5/00*    (2006.01)
(Continued)

(52) U.S. Cl.
CPC ............. *G01V 1/345* (2013.01); *G01V 1/28* (2013.01); *G06T 5/002* (2013.01); *G06T 5/10* (2013.01);
(Continued)

(58) Field of Classification Search
None
See application file for complete search history.

(56) References Cited

U.S. PATENT DOCUMENTS

| 493,339 A | 3/1893 | Phillips |
| 1,028,012 A | 5/1912 | Foster |

(Continued)

FOREIGN PATENT DOCUMENTS

| EP | 0109341 | 2/1991 |
| EP | 1508058 | 2/2005 |

(Continued)

OTHER PUBLICATIONS

Bradley et al., "The FBI Wavelet/Scalar Quantization Standard for gray-scale fingerprint impage compression," proceedings vol. 1961, Visual Information Processing II, Aug. 27, 1993, 12 pages.

(Continued)

*Primary Examiner* — Brent A. Fairbanks
(74) *Attorney, Agent, or Firm* — Fish & Richardson P.C.

(57) ABSTRACT

A three-dimensional (3D) seismic data set is divided into a plurality of 3D source wavefield subsets, each 3D source wavefield subset is stored in an array element of an array. For each array element, the associated 3D source wavefield is decomposed into a smaller data unit; data boundaries of the smaller data units are randomly shifted; a folding operation and a sample operator is applied to the smaller data units to keep the smaller data units from overlapping; the folded smaller data units are smoothed to generate smoothed data; a quantization operation is performed on the smoothed data to produce quantized data; and the quantized data is compression encoded to generate compressed data. The compressed data associated with each array element is decompressed to generate a 3D seismic output image.

20 Claims, 8 Drawing Sheets

(51) Int. Cl.
*H04N 19/625* (2014.01)
*H04N 19/124* (2014.01)
*H04N 19/42* (2014.01)
*G06T 5/10* (2006.01)
*H04N 19/91* (2014.01)
*G06T 9/00* (2006.01)
*G01V 1/28* (2006.01)

(52) U.S. Cl.
CPC .............. *G06T 9/00* (2013.01); *H04N 19/124* (2014.11); *H04N 19/42* (2014.11); *H04N 19/625* (2014.11); *H04N 19/91* (2014.11); *G01V 2210/512* (2013.01); *G06T 9/007* (2013.01)

(56) References Cited

U.S. PATENT DOCUMENTS

| | | | |
|---|---|---|---|
| 3,441,631 | A | 4/1969 | Fernald et al. |
| 3,502,741 | A | 3/1970 | Fernald et al. |
| 3,688,249 | A | 8/1972 | Backus et al. |
| 3,691,529 | A | 9/1972 | Pizante |
| 3,753,222 | A * | 8/1973 | Trostle ................ G01V 1/003 367/56 |
| 4,449,208 | A | 5/1984 | Moeckel et al. |
| 4,562,540 | A | 12/1985 | Devaney |
| 4,935,904 | A | 6/1990 | Chambers et al. |
| 5,021,891 | A | 6/1991 | Lee |
| 5,292,837 | A | 3/1994 | Heinrich et al. |
| 5,297,236 | A | 3/1994 | Antill et al. |
| 5,367,385 | A | 11/1994 | Yuan |
| 5,719,958 | A | 2/1998 | Wober et al. |
| 5,793,898 | A | 8/1998 | Nakamoto |
| 6,160,919 | A * | 12/2000 | Hale ..................... G06T 9/007 382/250 |
| 6,370,477 | B1 | 4/2002 | Vermeer |
| 6,767,975 | B1 | 7/2004 | Liu |
| 7,085,195 | B2 | 8/2006 | Taner et al. |
| 7,157,532 | B2 | 1/2007 | Payer et al. |
| 7,196,969 | B1 | 3/2007 | Karazincir |
| 7,373,252 | B2 | 5/2008 | Sherrill et al. |
| 7,643,377 | B1 | 1/2010 | Uzes |
| 8,116,168 | B1 | 2/2012 | Luo et al. |
| 8,120,991 | B2 | 2/2012 | Koren et al. |
| 8,209,126 | B2 | 6/2012 | Berkovitch |
| 8,227,653 | B2 | 7/2012 | Weber et al. |
| 8,315,124 | B2 | 11/2012 | Zhu |
| 8,531,914 | B2 | 9/2013 | Delpart-Jannaud |
| 8,760,967 | B2 | 6/2014 | Nichols et al. |
| 8,948,463 | B2 | 2/2015 | Landa |
| 9,116,255 | B2 | 8/2015 | Eick et al. |
| 9,128,205 | B2 | 9/2015 | Guan et al. |
| 9,395,457 | B2 | 7/2016 | Poole |
| 9,536,143 | B2 | 1/2017 | Jiang et al. |
| 9,568,627 | B2 | 2/2017 | Guigne et al. |
| 9,702,997 | B2 | 7/2017 | Sava et al. |
| 9,702,999 | B2 | 7/2017 | Sun et al. |
| 9,724,681 | B2 | 8/2017 | Lucciulli et al. |
| 9,726,771 | B1 | 8/2017 | Popovici et al. |
| 9,880,303 | B2 | 1/2018 | Landa et al. |
| 9,896,392 | B2 | 2/2018 | Meiswinkel et al. |
| 9,919,298 | B2 | 3/2018 | Schmidt et al. |
| 10,022,698 | B2 | 7/2018 | Shaik et al. |
| 10,228,476 | B2 | 3/2019 | Xie et al. |
| 10,232,339 | B2 | 3/2019 | Bischof et al. |
| 10,280,125 | B2 | 5/2019 | Sogo et al. |
| 10,295,685 | B2 | 5/2019 | Zhang et al. |
| 10,310,122 | B2 | 6/2019 | Haacke et al. |
| 10,324,204 | B1 | 6/2019 | Sturzu et al. |
| 10,324,205 | B2 | 6/2019 | Wang et al. |
| 2004/0243312 | A1 | 12/2004 | Schonewille |
| 2010/0097888 | A1 | 4/2010 | Neelamani et al. |
| 2010/0131205 | A1 | 5/2010 | Berkovitch et al. |
| 2010/0171740 | A1 | 7/2010 | Andersen |
| 2010/0212909 | A1 | 8/2010 | Baumstein |
| 2010/0232723 | A1 | 9/2010 | Averbuch et al. |
| 2012/0004849 | A1 | 1/2012 | Aarre |
| 2012/0051176 | A1 | 3/2012 | Liu |
| 2013/0060476 | A1 | 3/2013 | Thomson |
| 2013/0176819 | A1 | 7/2013 | Poole |
| 2014/0032119 | A1 | 1/2014 | Landa |
| 2014/0088879 | A1 * | 3/2014 | Hennenfent ........... G01V 1/362 702/17 |
| 2014/0149046 | A1 | 5/2014 | Baina et al. |
| 2014/0269185 | A1 | 9/2014 | Ferber |
| 2014/0293744 | A1 | 10/2014 | Zhang |
| 2014/0328140 | A1 | 11/2014 | Khalil et al. |
| 2015/0112601 | A1 | 4/2015 | Ozbek |
| 2015/0124559 | A1 | 5/2015 | Cha et al. |
| 2015/0170411 | A1 | 6/2015 | Thomas |
| 2015/0276956 | A1 | 10/2015 | Khalil et al. |
| 2015/0355355 | A1 | 12/2015 | Guan et al. |
| 2016/0109595 | A1 | 4/2016 | Stork |
| 2016/0325274 | A1 | 11/2016 | Schmidt |
| 2016/0327661 | A1 | 11/2016 | Mousa |
| 2016/0330486 | A1 * | 11/2016 | Said ....................... H04N 19/70 |
| 2016/0334526 | A1 | 11/2016 | Pica |
| 2016/0341837 | A1 | 11/2016 | Eick |
| 2016/0367977 | A1 | 12/2016 | Shaikh et al. |
| 2017/0006288 | A1 | 1/2017 | Boitard et al. |
| 2017/0097428 | A1 | 4/2017 | Sun |
| 2017/0192118 | A1 | 7/2017 | Du et al. |
| 2017/0197892 | A1 | 7/2017 | Khawaji |
| 2017/0371050 | A1 | 12/2017 | Sun et al. |
| 2018/0120464 | A1 | 5/2018 | Sun et al. |
| 2018/0143334 | A1 | 5/2018 | Hegna et al. |
| 2018/0143337 | A1 | 5/2018 | Koren et al. |
| 2018/0180755 | A1 | 6/2018 | Yan |
| 2018/0364374 | A1 | 12/2018 | Brenders et al. |
| 2019/0018155 | A1 | 1/2019 | Nakshatrala et al. |
| 2019/0092707 | A1 | 3/2019 | Melibari et al. |
| 2019/0179045 | A1 | 6/2019 | Zhang et al. |

FOREIGN PATENT DOCUMENTS

| | | |
|---|---|---|
| EP | 2294824 | 3/2011 |
| EP | 3029491 | 6/2016 |
| GB | 2483997 | 3/2012 |
| GB | 2525072 | 10/2015 |
| GB | 2530126 | 3/2016 |
| GB | 2490584 | 4/2017 |
| WO | 9850886 | 11/1998 |
| WO | WO 2011154762 | 12/2011 |
| WO | WO 2012051267 | 4/2012 |
| WO | WO 2015051267 | 4/2015 |
| WO | WO 2016156530 | 10/2016 |
| WO | WO 2018187461 | 10/2018 |
| WO | WO 2019055565 | 3/2019 |

OTHER PUBLICATIONS

Jawerth and Sweldens, "Biorthogonal Smooth Local Trigonometric Bases," the Journal of Fourier Analysis and Applications, vol. 2, No. 2, Apr. 1995, 25 pages.

Jawerth and Sweldens, "Signal compression with smooth local trigonometric bases," Optical Engineering, vol. 33, Issue 7, Jul. 1994, 11 pages.

Malvar, "Lapped Transforms for Efficient Transform/Subband Coding," IEEE Transaction on Acoustics, Speech, and Signal Processing, vol. 38, No. 6, Jun. 1990, 10 pages.

Malvar, "The LOT: Transform Coding Without Blocking Effects," IEEE Transactions on Acoustics, Speech, and Signal Processing, vol. 37, No. 4, Apr. 1989, 7 pages.

Princen and Bradley, "Analysis/Synthesis Filter Bank Design Based on Time Domain Aliasing Cancellation," IEEE Transaction on Acoustics, Speech and Signal Processing, vol. ASSP-34, No. 5, Oct. 1986, 9 pages.

Singh, "An Algorithm for Improving the Quality of Compacted JPEG Image by Minimizes the Blocking Artifacts," International Journal of Computer Graphics and Animation, vol. 2, No. 2, Jul. 31, 2012, 19 pages.

(56) References Cited

OTHER PUBLICATIONS

Wallace, "The JPEG Still Picture Compression Standard," Communications of the ACM, Apr. 1991, submitted in Dec. 1991 for publication in IEEE Transactions for Consumer Electronics, 17 pages.
Wood, "Seismic Data Compression Methods," Geophysics vol. 39, No. 4, Aug. 1974, 27 pages.
Yeo and Liu, "Volume Rendering of DCT-Based Compressed 3D Scalar Data," IEEE Transaction on Visualization and Computer Graphics, vol. 1, No. 1, Mar. 1995, 15 pages.
Zhao et al., "Postprocessing technique for blocking artifacts reductions in DCT domain," Electronics Letters, vol. 40, No. 19, Jan. 1, 2004, 2 pages.
International Search Report and Written Opinion issued in International Application No. PCT/US2018/027117 dated Jul. 23, 2018, 16 pages.
Gulf Cooperation Council Examination Report issued in GCC Appln. No. GC 2018-35127 dated Oct. 27, 2019, 4 pages.
Australian Examination Report in Australian Appln. No. 2018251796, dated Jul. 9, 2020, 9 pages.
Bahorich and Farmer, "3D Seismic Discontinuity for Faults and Stratigraphic Features: the Coherence Cube," the Leading Edge, 1995, vol. 14, 6 pages.
Batany et al., "Adaptive multiple subtraction: Unification and Comparison of matching filters based on the lq-norm and statistical independence," Geophysics, Jan.-Feb. 2016, 81(1), 13 pages.
Berkhout and Verschuur, "Estimation of multiple scattering by iterative inversion, Part I: Theoretical considerations," Geophysics, Sep.-Oct. 1997, vol. 62, No. 5, 10 pages.
Chen and Fomel, "Random noise attenuation using local signal-and-noise orthogonalization," Geophysics, 2015, vol. 80, No. 6, WD1-WD9, 19 pages.
Chen et al., "Directly imaging steeply-dipping fault zones in geothermal fields with multicomponent seismic data," Geothermics, Sep. 2015, vol. 57, 31 pages.
Donno et al., "Curvelet-based multiple prediction," Geophysics, Nov.-Dec. 2010, vol. 75, No. 6, 9 pages.
Donno, "Improving multiple removal using least-squares dip filters and independent component analysis," Geophysics, Sep.-Oct. 2011, vol. 76, No. 5, 14 pages.
Fei et al., "An Endemic Problem in Reverse-Time Migration," 84th Annual International Meeting, SEG, Expanded Abstracts, 2014, pp. 3811-3815.
Fei et al., "Removing False Images in Reverse-Time Migration: The Concept of De-Primary," Geophysics, Nov.-Dec. 2015, 80(6): S237-S244.
Fletcher, "Suppressing Unwanted Internal Reflections in Prestack Reverse-Time Migration," Geophysics, Nov.-Dec. 2006, vol. 71, No. 6, pp. E79-E82.
Fomel, "Shaping regularization in geophysical-estimation problems," Geophysics, vol. 72, No. 2, Mar.-Apr. 2007, 8 pages.
Fomel, "Theory of 3-D Angle Gathers in Wave-Equation Imaging," 74th Annual International Meeting, SEG, Expanded Abstracts, Oct. 2004, pp. 1053-1056.
Forestiere et al., "Oligomerization of Monoolefins by Homogenous Catalysts," Oil & Science and Technology Review de l'Institute Francais du Petrole, vol. 64, No. 6, Nov. 2009, pp. 663-664.
Guitton and Verschuur, "Adaptive subtraction of multiples using the L1-norm," Geophysical Prospecting, vol. 52, Issue 1, Jan. 2004, 12 pages.
Guitton, "Multiple attenuation in complex geology with a pattern-based approach," Geophysics, vol. 70, No. 4, Jul.-Aug. 2005, 11 pages.
Herrmann et al., "Non-linear primary-multiple separation with directional curvelet frames," Geophysical Journal International, vol. 170, Issue 2, Aug. 2007, 19 pages.
Hu et al., "Angle gathers from reverse time migration using analytic wavefield propagation and decomposition in the time domain," Geophysics, vol. 81, No. 1, Jan. 1, 2016, 9 pages.

Jiang, "Seismic imaging strategies for visco-acoustic full waveform inversion," Earth Sciences, PSL, Research University, 2019, 213 pages.
Khaidukov et al., "Diffraction imaging by focusing-defocusing: An outlook on seismic superresolution," Geophysics, vol. 69, No. 6, Nov.-Dec. 2004, 13 pages.
Kim et al., "3D Least-Squares Reverse Time Migration Using Wavefield Decomposition via Hilbert transform," 79th EAGE Conference & Exhibition, Jun. 12, 2017, 5 pages.
Kim et al., "Increasing signal-to-noise ratio of marine seismic data: a case study from offshore Korea," Journal of Applied Geophysics, Nov. 2016, 134:136-145.
Klokov et al., "Separation and imaging of seismic diffractions using migrated dip-angle gathers," Geophysics, vol. 77, No. 6, S131-S143.
Kong et al., "Diffraction separation by plane-wave prediction filtering," Chinese Geophysical Society, Appl. Geophys., Jul. 2017, 14:399.
Landa et al., "Separation, imaging and velocity analysis of seismic diffractions using migrated dip-angle gathers," 78th Annual International Meeting, SEG, Expanded Abstracts, 2008, 5 pages.
Li and Lu, "Demultiple strategy combining Radon filtering and Radon domain adaptive multiple subtraction," Journal of Applied Geophysics, vol. 103, Apr. 2014, 11 pages.
Liu and Lu, "Diffraction Imaging Based on Dip Angle Gather of Seismic Wave Equation Migration," Near Surface Geophysics Asia Pacific Conference, Beijing, China, Jul. 17-19, 2013, 4 pages.
Liu et al., "An Effective Imaging Condition for Reverse-Time Migration using Wavefield Decomposition," Geophysics, vol. 76, No. 1, Jan. 2011, pp. S29-S39.
Liu et al., "Imaging diffractors using wave-equation migration," Geophysics, vol. 81, No. 6, Nov.-Dec. 2016, 10 pages.
Liu et al., "Reverse-Time Migration using One-Way Wavefield Imaging Condition," 77th Annual International Meeting, SEG Expanded Abstracts, 2007, pp. 2170-2174.
Luo et al., "Edge-preserving smoothing and applications," the Leading Edge, vol. 21, 2002, 5 pages.
Mandaviani et al., "Selective Ethylene Dimerization Toward 1-butene by a New Highly Efficient Catalyst System and Determination of Its Optimum Operating Conditions in a Buchi Reactor," International Journal of Chemical Engineering and Applications, vol. 1, No. 3, Oct. 2010, pp. 276-281, 6 pages.
Mahmoudian et al., "Angle-domain CIG: A review of angle domain common image gathers," Crewes Research Report—vol. 1, Jan. 1, 2009, 22 pages.
Popovici et al., "High resolution diffraction imaging of small scale fractures in shale and carbonate reservoirs," Unconventional Resources Technology Conference, 2015, 9 pages.
Qin et al., "Kirchhoff preSDM interactive dip-gather stacking and dip illumination panel generation," 75th Annual International Meeting, SEG, Expanded Abstracts, 2005, 5 pages.
Rickett et al., "P167—Adaptive multiple subtraction with nonstationary helical shaping filters," EAGE 63rd Conference and Technical Exhibition, Jun. 11-15, 2001, 4 pages.
Sava et al. "Angle-Domain Common Image Gathers by Wavefield Continuation Methods," Geophysics, 68, May-Jun. 2003, pp. 1065-1074.
Schoepp et al., "Multifocusing 3D diffraction imaging for detection of fractured zones in mudstone reservoirs: Case history," Interpretation, Feb. 2015, 3(1), 12 pages.
Shen et al, "Azimuthal offset-dependent attributes applied to fracture detection in a carbonate reservoir," Geophysics, Mar.-Apr. 2002, 67(2):355-364.
Spitz, "Pattern recognition, spatial predictability and subtraction of multiple events," the Leading Edge, Jan. 1999, 4 pages.
Sturzu et al., "Diffraction imaging using specularity gathers," Journal Seismic Exploration, vol. 23, Feb. 2014, 18 pages.
Sun et al., "Comparative study of dip-angle domain Gaussian beam migration and Kirchhoff migration in diffraction separation," SEG Technical Program Expanded Abstracts, 2014, 5 pages.
Sun et al., "Q-compensated least-squares reverse time migration using low-rank one-step wave extrapolation," Geophysics, vol. 81, No. 4, Jul.-Aug. 2016, 9 pages.

(56) References Cited

OTHER PUBLICATIONS

Taner et al., "Separation and imaging of seismic diffractions using plane-wave decomposition," SEG Technical Program Expanded Abstracts, Jan. 2006, 25(1):2401-2405.

Van Veldhuizen, "Integrated approach to 3-D seismic acquisition geometry analysis," Technische Universiteit Delft, Sep. 2006, 192 pages.

Ventosa et al., "Adaptive multiple subtraction with wavelet-base complex urary Wiener filters," Jun. 2018, Geophysics, vol. 77, Nov.-Dec. 2012, 18 pages.

Verschuur et al., "Adaptive surface-related multiple elimination," Geophysics, vol. 57, No. 9, Sep. 1992, 12 pages.

Wang et al., "RTM Artifact Removal via a Fast Algorithm for Wavefield Decomposition," 2016 SEG International Exposition and 86th Annual Meeting, 2016, 1 page.

Wang et al., "Seismic wave imaging in visco-acoustic media," Science in China Ser. A Mathematics, 2004, vol. 47, 146-154, 9 pages.

Wang et al., "Up/down and P/S decompositions of elastic wavefields using complex seismic traces with applications to calculations Poynting vectors and angle-domain common-image gathers from reverse time migrations," Geophysics, vol. 81, No. 4, Jul. 1, 2016, 15 pages.

Wang, "Multiple subtraction using an expanded multichannel matching filter," Geophysics, vol. 68, No. 1, Jan.-Feb. 2003, 9 pages.

Wiggins, "Multiple attenuation by explicit wave extrapolation to an interpreted horizon," the Leading Edge, Jan. 1999, 7 pages.

Xu et al., "3D Angle Gathers from Reverse-Time Migration," Geophysics, vol. 76, No. 2, Mar.-Apr. 2011, pp. S77-S92.

Xue et al., "Amplitude-preserving nonlinear adaptive multiple attenuation using the high order sparse Radon Transform," Sinopec Geophysical Research Institute, IOP Science, Journal of Geophysics and Engineering, vol. 31, No. 3, Apr. 2016, 2 pages.

Zhang and Zhang, "Diffraction imaging using shot and opening angle gathers: A prestack time migration approach," Geophysics, vol. 79, No. 2, Mar.-Apr. 2014, 11 pages.

Zhang et al, "Improving reverse time migration angle gathers by efficient wavefield separation". Geophysics, vol. 83, No. 2, Mar. 2018, pp. S187-S195.

Zhang et al, "RTM angle gathers by optical flow with wavefield separation", SEG Technical Program Expanded Abstracts, Aug. 27, 2018, 5 pages.

Zhang et al., "Efficient Wave-Equation-Based Diffraction Imagining," Geophysics, vol. 82, No. 5, Sep.-Oct. 2019, 11 pages.

Zhang, "RTM Angle Gathers and Specular Filter (SF) RTM using Optical Flow," 84th Annual International Meeting, SEG, Expanded Abstracts, 2014, pp. 3816-3820.

Zhang et al., "Compensating for visco-acoustic effects in reverse-time migration," SEG Denver 2010 Annual Meeting, 2010, 5 pages.

Zhao et al., "A stable and efficient approach of Q reverse time migration," Geophysics, vol. 83, No. 6, Nov.-Dec. 2018, 11 pages.

Zhao et al., "A stable approach for Q-compensated viscoelastic reverse time migration using excitation amplitude imaging condition," Geophysics, vol. 83, No. 5, Sep.-Oct. 2018, 18 pages.

* cited by examiner

COMPRESSING SEISMIC WAVEFIELDS IN THREE-DIMENSIONAL REVERSE TIME MIGRATION

CROSS-REFERENCE TO RELATED APPLICATION(S)

This application claims the benefit of priority to U.S. Provisional Application Ser. No. 62/484,101, filed Apr. 11, 2017, the contents of which are hereby incorporated by reference.

BACKGROUND

Seismic imaging is a tool that bounces sound waves off of underground structures (such as, rock and other sedimentary layers or caves) to reveal possible petroleum-bearing formations. Reverse time migration (RTM) is a seismic imaging method providing accurate imaging in and below an area with both structural and velocity complexities. In RTM, seismic images are generated by a zero-lag, cross-correlation of both source and receiver wavefields. The source wavefield is computed by forward propagation, while the receiver wavefield is computed by backward propagation. Due to opposite propagation directions with respect to the source and receiver wavefields, RTM first computes and stores data for the entire source wavefield in a data storage location (for example, a magnetic disk drive). The source wavefield data is then retrieved for processing when a corresponding receiver wavefield is available. This approach consumes a large amount of computing resources (for example, processor cycles, data bus bandwidth, computational memory (for example, random access memory (RAM)), network bandwidth, and data storage space) due to its requirement of reading/writing extremely large data sets to storage locations.

SUMMARY

The present disclosure describes compressing seismic data.

In an implementation, a three-dimensional (3D) seismic data set is divided into a plurality of 3D source wavefield subsets, each 3D source wavefield subset is stored in an array element of an array. For each array element, the associated 3D source wavefield is decomposed into a smaller data unit; data boundaries of the smaller data units are randomly shifted; a folding operation and a sample operator is applied to the smaller data units to keep the smaller data units from overlapping; the folded smaller data units are smoothed to generate smoothed data; a quantization operation is performed on the smoothed data to produce quantized data; and the quantized data is compression encoded to generate compressed data. The compressed data associated with each array element is decompressed to generate a 3D seismic output image.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations so as to realize one or more of the following advantages. First, back propagation of a source wavefield is avoided as in conventional methods for compressing seismic wavefield data (such as, saving the seismic wavefield at the boundaries). Second, storage requirements to save data for an entire source wavefield, compared to the storage requirements without using compression, have been shown to be dramatically reduced (for example, from 1 TB to, approximately, 20-30 GB). Third, the described methodology improves imaging results by reducing artifacts in a decompressed data volume, which is critically important for proper interpretation of the image results (for example, an image containing artifacts can confuse an interpreter (such as, a geo-scientist or analytical software process) and lead to improper decisions with respect to prospective drilling and exploring initiatives.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
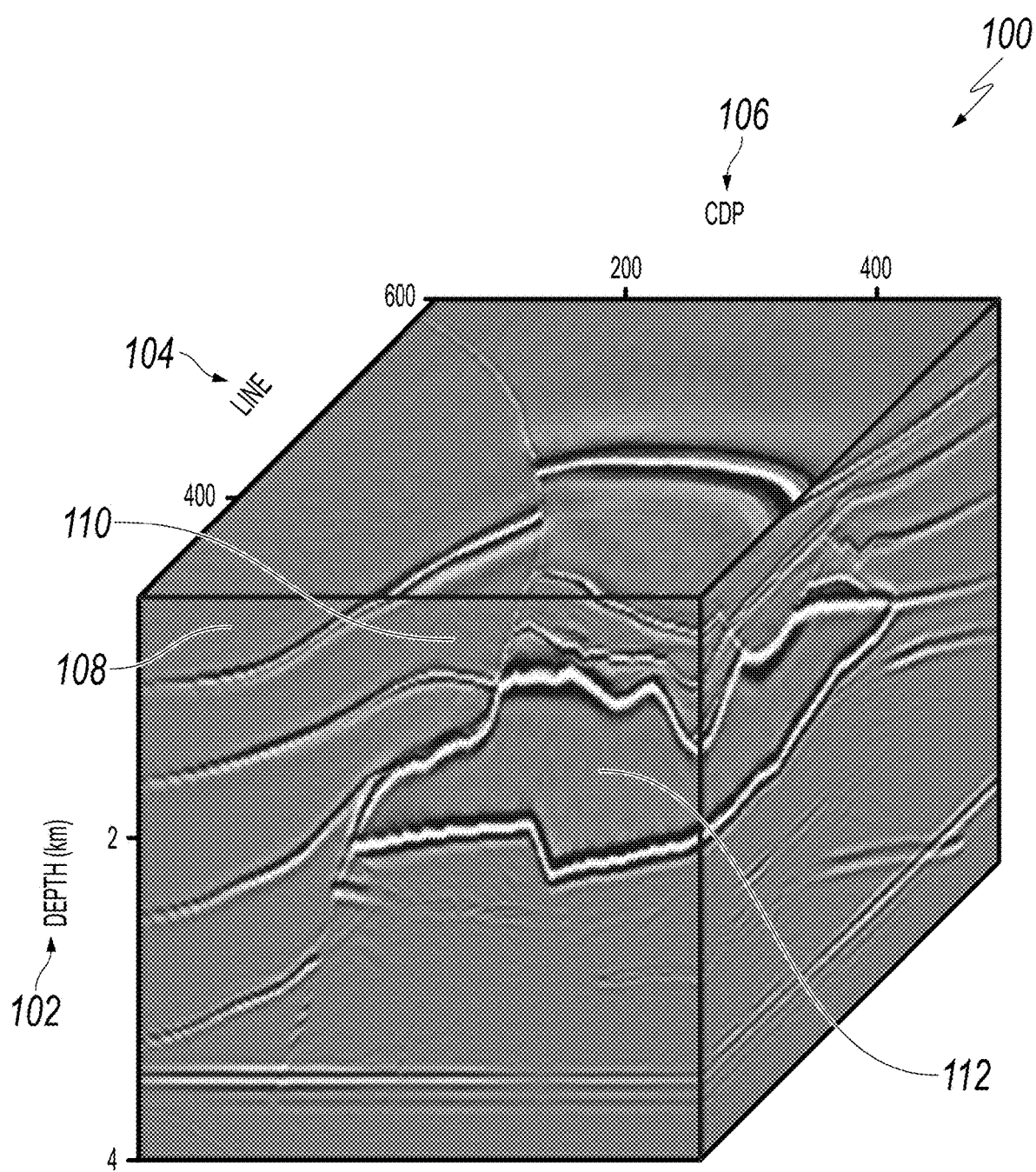
FIG. 1 is an example three-dimensional (3D) reverse time migration (RTM) seismic output image calculated without data compression, according to an implementation of the present disclosure.

The following detailed description describes compressing seismic data, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Seismic imaging is a tool that bounces sound waves off of underground structures (such as, rock and other sedimentary layers or caves) to reveal possible petroleum-bearing formations. Reverse time migration (RTM) is a seismic imaging method providing accurate imaging in and below an area with both structural and velocity complexities. In RTM, seismic images are generated by a zero-lag, cross-correlation of both source and receiver wavefields. The source wavefield is computed by forward propagation, while the receiver wavefield if computed by backward propagation. Due to opposite propagation directions with respect to the source and receiver wavefields, RTM first computes and stores data for the entire source wavefield in a data storage location (for example, a magnetic disk drive). The source wavefield data is then retrieved for processing when a corresponding receiver wavefield is available. This approach consumes a large amount of computing resources (for example, processor cycles, data bus bandwidth, computational memory (for example, random access memory (RAM)), network bandwidth, and data storage space) due to its requirement of reading/writing extremely large data sets to storage locations.

This disclosure describes a new approach for compressing seismic data to increase the efficiency of RTM. In some implementations, the described compression methodology applied in RTM algorithms results in compression of source wavefield seismic data from one-tenth to one-hundredth of an original data set size. The reduced size of the compressed seismic data allows storing large data sets of source wavefield data in computational memory, which can be quickly obtained and utilized during data processing. While similar in some ways to existing JPEG data compression technology, the described method adopts a novel folded discrete cosine transform and Huffman encoding to avoid blocking artifact issues present in existing JPEG compression algorithms, avoidance of which is critical for effective compression of seismic data. The use of the described RTM compression methodology also accelerates seismic data processing, reduces computer data storage consumption, and permits practical use of RTM processing of seismic data. Note, that while it is possible in the described methodology to compress both the source wavefield seismic data and the receiver wavefield seismic data, it is only necessary to compress either the source or receiver wavefield seismic data set. This disclosure focuses on compression of the source wavefield seismic data set, but compressing the receiver wavefield seismic data set or both wavefield seismic data sets (with appropriate adaptation of the described methodology) is also considered to be within the scope of this disclosure.

At a high-level, the described data compression method is a modification of a conventional JPEG compression method, which is typically used to compress photo and other images. For the JPEG approach, a three-dimensional (3D) image is typically divided into 8*8*8 pixel blocks, each block compressed and saved. However, reconstructed images using data compressed by the standard JPEG image compression approach results in images with more differences (compared to the original image) at compressed pixel block boundaries than in internal areas of the pixel blocks. With single 3D images, these boundary artifacts (or noise) can usually be ignored. However, as there are a large number of 3D images in RTM, the boundary artifacts accumulate and make the resultant data ineffective for seismic studies. The described data compression method addresses the boundary artifact shortcomings of the conventional JPEG compression algorithm to preserve the usefulness of compressed 3D seismic data.

While the conventional JPEG compression method is designed to compress a single multi-dimensional array of 3D pixel blocks, the described 3D RTM image compression method can be used to compress millions of arrays of 3D pixel blocks. Simply using folded-discrete cosine transform (DCT) methods (as in a conventional JPEG compression method) in an image compression form of RTM, results in obvious boundary artifacts in the RTM image output. To mitigate these generated boundary artifacts, the described 3D RTM image compression method describes using a modified conventional JPEG compression method with random-blocking boundaries. The random-blocking boundaries are randomly choosing for compressing the source wavefield for each seismic shot and time step. As will be seen in the description, the artifacts at the pixel block boundaries cancel each other when millions of resultant seismic images using the decompressed datasets are summed into an output seismic image (for example, output seismic image 300). The resultant output seismic image can be used to mitigate risk of drilling a petroleum well in a particular location.

The proposed 3D RTM image compression method enhances efficiency of existing RTM analysis technology for imaging of complex sub-surface structures and other uses. The described methodology also enhances speed and efficiency of data storage on computer data stores, microprocessor processing of image data, and transmission of image data over networks (for example, speed and bandwidth usage improvements). The proposed 3D RTM image compression method also provides a method of attenuating artifacts/noise when compressing data to make the data more useful for analysis and other purposes.

Referring to FIG. 1, FIG. 1 is an example 3D RTM seismic output image 100 calculated without data compression, according to an implementation of the present disclosure. Seismic output image 100 is illustrated with three axes, here depth (kilometers (km)) 102, line 104, and common depth point (CDP) 106.

Line 104 represents lines of geophones that are used to record reflections of seismic energy transmitted into earth. In some applications, there can be many lines of geophones. The transmitted seismic energy is typically generated by, for example, an explosive, air cannon, or vibratory apparatus (for example, compressional or shear). Most seismic exploration is performed with compressional waves (including the explosives and air cannons). The transmitted seismic energy propagates into the earth and reflects from various sub-surface earth layers and back toward the earth's surface where it is detected and recorded by one or more lines of geophones.

CDP 106 represents the unique point on an individual sub-surface seismic energy reflector (for example, a rock layer) from which seismic reflection information is recorded in traces at different offsets. A set of traces containing information for one CDP is called a "CDP gather."

In the illustrated seismic output image, labels 108, 110, and 112 indicate areas of interest with respect to artifacts (at regularly spaced boundaries, especially shallow portions of the image). As can be seen by focusing on the labeled areas of the image (108, 110, and 112), using a conventional (and computationally expensive) 3D RTM algorithm for seismic image processing with no data compression results in a seismic output image with no discernable (or merely insignificant) image artifacts.

Figure 2:
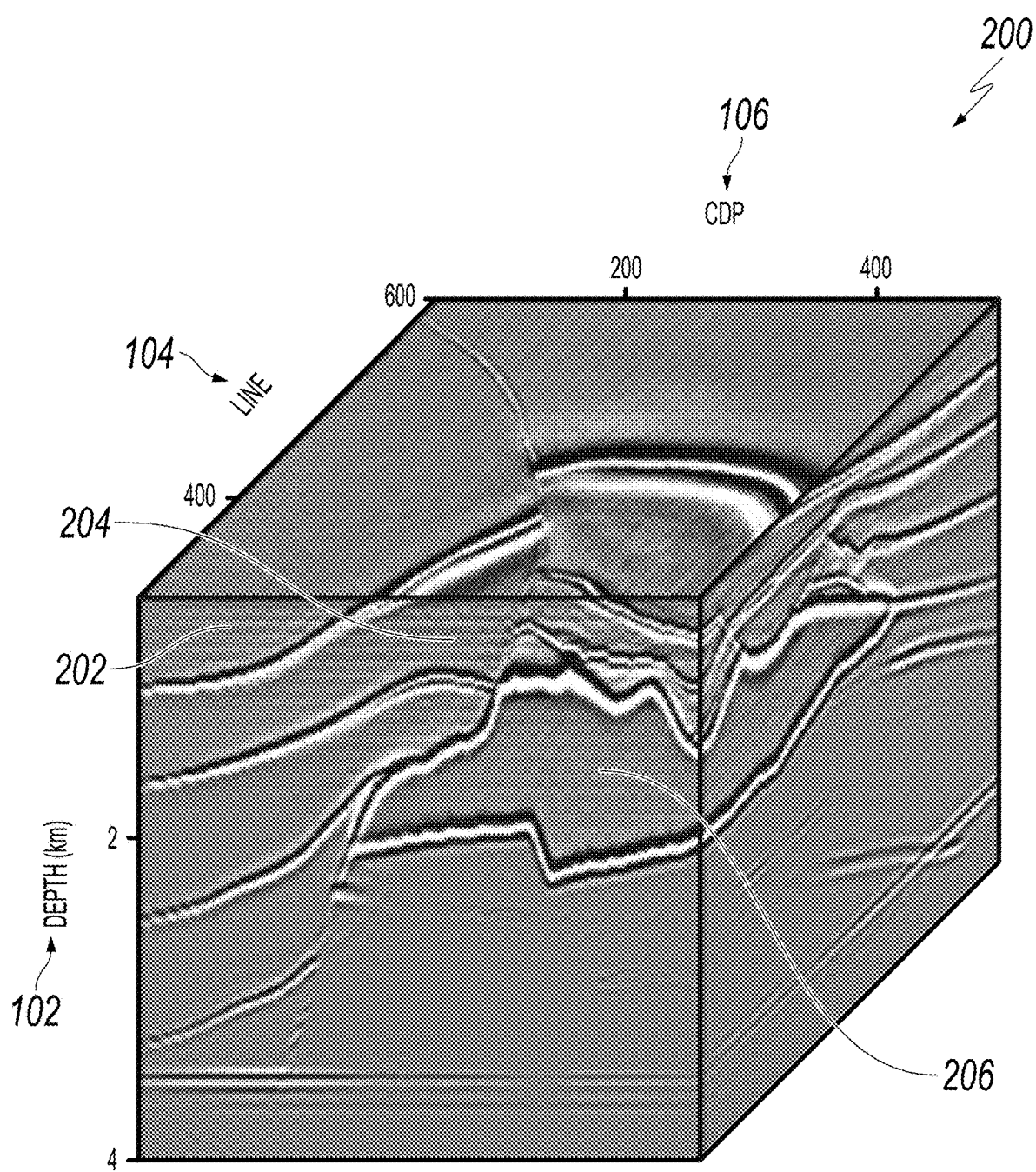
FIG. 2 is an example 3D RTM seismic output image calculated using a conventional JPEG compression method, according to an implementation of the present disclosure.

Referring now to FIG. 2, FIG. 2 is an example 3D RTM seismic output image 200 calculated using a conventional JPEG compression method, according to an implementation of the present disclosure. As can be seen in seismic output image 200, resultant compression artifacts (appearing as regular horizontal bands) from the conventional JPEG compression method have appeared at labeled areas 202, 204, and 206 (which correspond to areas 108, 110, and 112, respectively).

Figure 3:
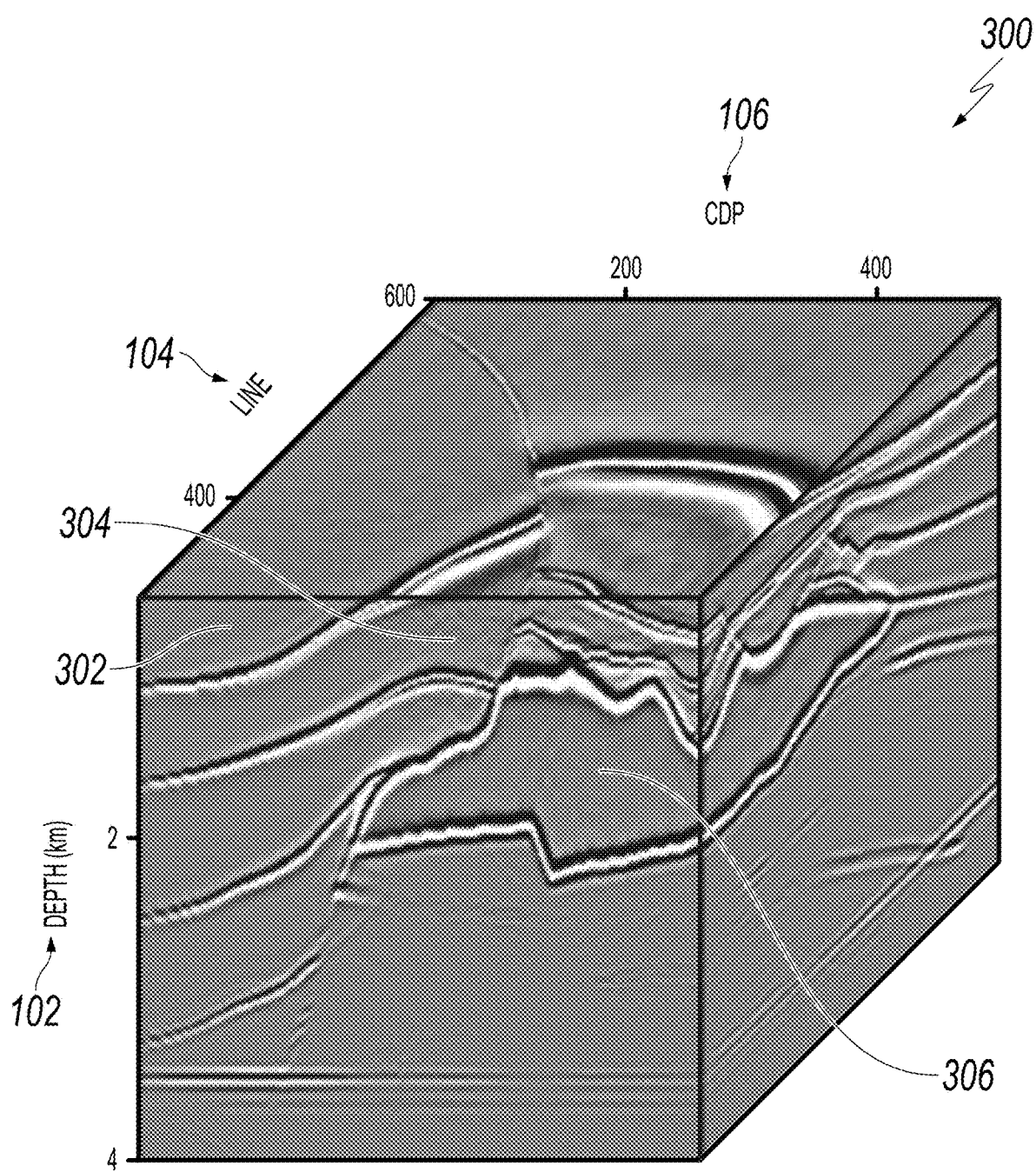
FIG. 3 is an example 3D RTM seismic output image calculated using the proposed 3D RTM image compression method of the disclosure, according to an implementation of the present disclosure.

Referring now to FIG. 3, FIG. 3 is an example 3D RTM seismic output image 300 calculated using the proposed 3D RTM image compression method of the disclosure, according to an implementation of the present disclosure. As can be seen in seismic output image 300, compression artifacts present in FIG. 2 (appearing as regular horizontal bands at labeled areas 202, 204, and 206) are not present. Labeled areas 302, 304, and 306 (which correspond to areas 108, 110, and 112 of FIG. 1 and 202, 204, and 206 of FIG. 2, respectively) closely resemble labeled areas 108, 110, and 112 of FIG. 1 and illustrate that, after processing with the described 3D RTM image compression method, seismic output image 300 is artifact free (or demonstrates non-detectable/insignificant differences) compared to FIG. 1. Additionally, seismic output image 300 was generated using a higher-efficiency 3D RTM image compression method (for example, the storage/transmission size of source wavefield seismic data was reduced). The described methodology can produce results as accurate as RTM methodologies processing uncompressed data, but with the added benefit of more efficient data storage and with almost the same or reduced computational resource requirements.

The proposed 3D RTM image compression method includes three major components: 1) a DCT, 2) Quantization and Encoding; and 3) Random Blocking Boundaries for Folded DCT. Note that 1) and 2) are existing components of a conventional JPEG image compression method.

1) DCT.

DCT is similar to a discrete Fourier transform in that it converts a spatial domain of an image into its frequency domain. The spatial domain contains numbers that reflect the intensity of every channel at a given pixel, while the frequency domain contains the change of intensity from one pixel to the next.

An entire 3D seismic data set can include, for example, 100,000 time-stamped, seismic 3D source wavefields. The entire 3D seismic wavefield data set would can be, for example, 500*600*800 pixels. Each of the 3D source wavefields can be stored in an array as a 3D source wavefield subset for processing. The described process loops through each of the 100,000 time-stamped 3D source wavefield subsets, divides each particular subset into smaller data units (for example, using a DCT into 8*8*8 pixel 3D blocks), and randomly shifts the particular subset's data prior to compression. In some implementations, the array can be time-indexed, where each received data element represents a time slice/step of the 3D seismic wavefield data set.

Figure 4:
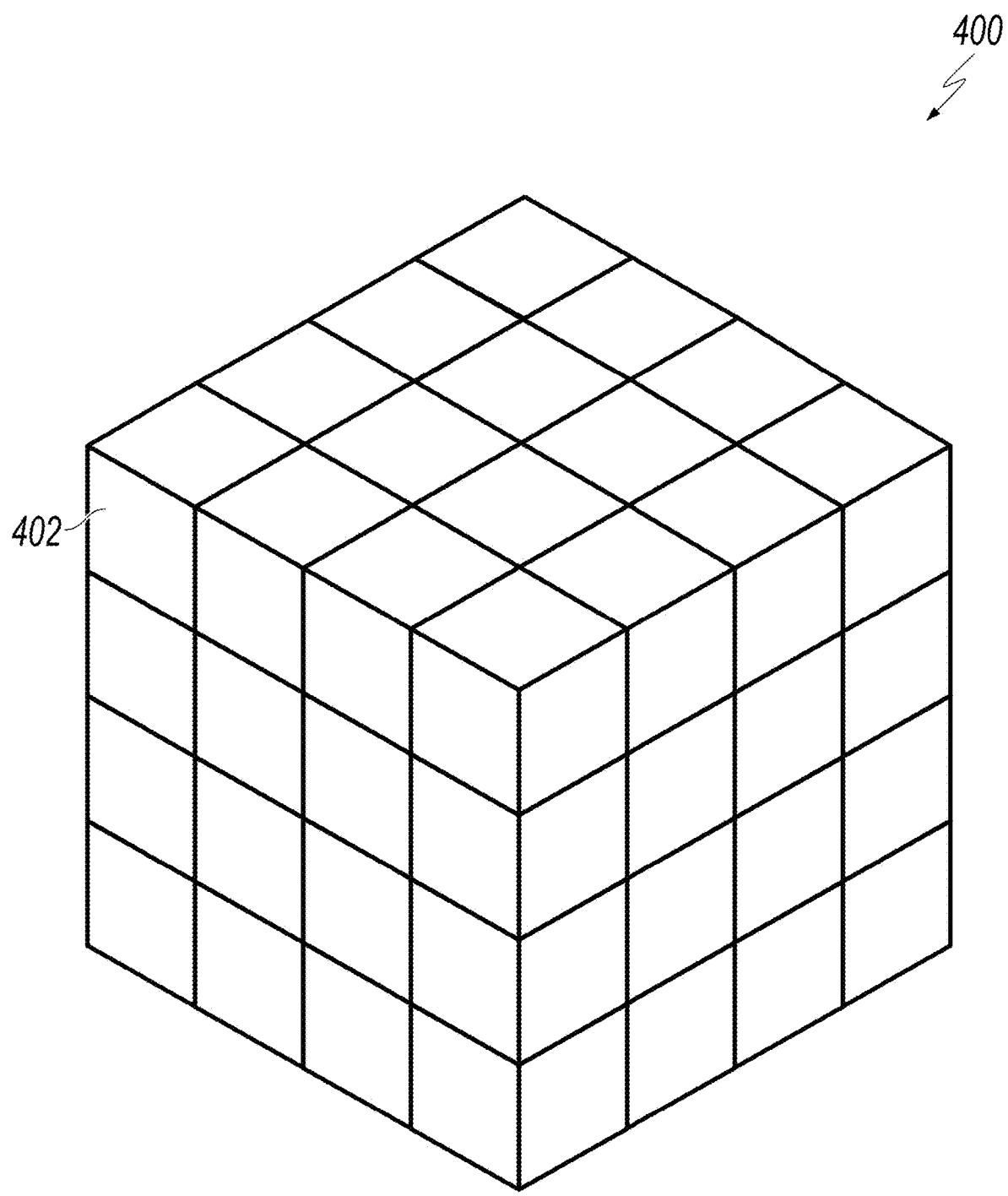
FIG. 4 is a block diagram illustrating an example portion (for example, one element of an array) of a 3D source wavefield seismic data subset decomposed using discrete cosine transform (DCT) into smaller data units (for example, blocks), according to an implementation of the present disclosure.

For example, referring to FIG. 4, FIG. 4 is a block diagram 400 illustrating an example portion (for example, one element of an array) of a 3D source wavefield seismic data subset decomposed using DCT into smaller data units (that is, blocks), according to an implementation of the present disclosure. Here block 402 can be considered an 8*8*8 pixel 3D block for purposes of visualization and understanding. In typical implementations, the entire 3D seismic data set can be indexed by A[iy][ix][iz], with iz=1:NZ, ix=1:NX, and iy=1:NY. The 3D seismic data set is divided to be MZ*MX*NY sub cubes, where MZ=NZ/8 MX=NX/8, MY=NZ/8, supposing that NZ, NX, NY is divisible by 8 (if not, simple padding can be used).

A forward DCT is applied to each array element (a 3D source wavefield seismic data subset) using Equation (1a):

$$Z(k) = \sum_{j=0}^{M-1} y(j)b(j)\sqrt{\frac{2}{M}}\cos\left[\frac{\pi(2k+1)j}{2M}\right] \quad (1a),$$

where k=0, 1, ..., M−1, y is an input array of the received 3D seismic wavefield data subset, b is defined as in Equation (1c), and Z represents forward DCT coefficients.

The original data in each block can be recovered by executing an inverse DCT transform, as defined in Equation (1b):

$$y(j) = \sum_{k=0}^{M-1} z(k)b(j)\sqrt{\frac{2}{M}}\cos\left[\frac{\pi(2k+1)j}{2M}\right] \quad (1b),$$

where j=0, 1, . . . M−1, M is the size of the blocks (for example, 8 pixels), and b(j) is expressed in Equation (1c):

$$b(j) = \begin{cases} \frac{1}{\sqrt{2}}, & j = 0 \\ 1, & \text{otherwise} \end{cases} \quad (1c).$$

Note that the forward and inverse DCT transforms can be represented by matrix multiplications:

$$z=Cy \text{ and } y=C^{-1}z.$$

Multi-dimensional DCT can be implemented by cascading a one-dimensional (1D) DCT transform in Equations (1a)-(1c) along each dimension of a 3D space. For instance, the cascaded DCT transforms of a block can be expressed by:

$$z=Cy=C_3C_2C_1y,$$

and the inverse DCT transform can be written as:

$$y=C^{-1}z=C_1^{-1}C_2^{-1}C_3^{-1}z,$$

where $C_i$ denotes a forward transform along an i-th direction and $C_i^{-1}$ denotes the inverse transform.

As previously described, blocking artifacts appear when the DCT is applied on each individual block. One possible solution is to taper the block edges and overlap the tapered edges. However, computational efficacy decreases and noise increases when overlapped blocks are utilized. As a result, tapering is not optimum for the described methodology.

Another possible solution is to use folding operations, which keep the 8*8*8 pixel blocks non-overlapped, but apply a 16-sample operator (that is, a 16*16*16 pixel sub-block while leaving only the center 8*8*8 pixels for avoiding boundary effects) to smooth the data. The folding operations are centered about block boundaries and denoted by:

$$y_l(j)=y(lM+j),$$

where l is a block index and j is a sample-within-a-block index.

In typical implementations, the folding operation is implemented by Equation (2a):

$$y_l(j)=f(j)x_l(j)+f(-j)x_l(-j)$$

$$y_l(-j)=f(j)x_l(-j)-f(-j)x_l(j) \quad (2a),$$

where l=1, 2, . . . , N/M−1 and j=1, 2, . . . , M/2−1, x is an input array, y is the input array after folding, and $f$ is defined as in Equation (2c).

In typical implementations, the unfolding operation is implemented by Equation (2b):

$$x_l(j)=f(j)y_l(j)-f(-j)y_l(-j)$$

$$x_l(-j)=f(j)y_l(-j)+f(-j)y_l(j) \quad (2b),$$

where l=1, 2, . . . , N/M−1, j=1, 2, . . . , M/2−1, and the folding function $f(j)$ is defined by:

$$f(j) = \sin\left[\frac{\pi}{4}\left(1 + \frac{2j}{M}\right)\right] \quad (2c).$$

Similar to DCT, the described folding and unfolding operations can be represented in matrix form as:

$$y=Fx \text{ and } x=F^{-1}y.$$

2) Quantization and Encoding.

Folding is a global method used on all of the 8*8*8 blocks to avoid or reduce boundary effects when using DCT. As both do not perform compression and are lossless transformations, DCT and folding can be reversed (that is, by using unfolding and inverse DCT) to be left with the original data set.

As previously described, for compression, data is folded, then a DCT transform is applied on the 8*8*8 pixel blocks. For decompression, the reverse is performed (inverse DCT and then unfolding is applied to the data blocks).

In the described methodology, after application of folding and DCT, a "lossy" procedure of quantization (compression to reduce the amount of data necessary to represent a particular image), followed by further compression encoding is performed.

To quantize a floating-point z into a integer i with B+1 bits (including a sign bit), Equations (3a)-(3d) are used. Integer i is defined as in Equation (3a):

$$i = \begin{cases} [z \times s + 0.5], & z \geq 0 \\ [z \times s - 0.5], & z \leq 0 \end{cases} \quad (3a)$$

where z is an input float point value, i is the resultant quantitated integer, [.] denotes truncating and leaving only an integer part. The quantization scale factor s is defined as in Equation (3b):

$$s = \frac{(2^B - 0.5)}{|z|_{max} Q(i, j, k)} \quad (3b),$$

where Q(i, j, k) is the Quantization matrix. Q(i, j, k) is defined as:

$$Q(i,j,k)=1+(i+j+k)*\text{Quality} \quad (3c),$$

where i, j, k=0 . . . M−1, and the parameter Quality is used to control a difference in the quantization level between low- and high-frequency components. A high value of Quality will lead many coefficients to be of value zero after quantization is performed.

In typical implementations, de-quantization used in decompression can be defined as in Equation (3d):

$$z=i/s \quad (3d),$$

where i is an integer input value, z is the floating point value after de-quantization, and s is the same as in Equation 3b.

After quantization, the value of the coefficients will be within a finite set of integers and entropy encoding algorithms (for example, Huffman or arithmetic encoding) can be used to perform data compression encoding. In typical implementations, Huffman encoding is chosen for compression encoding because it is computationally fast and simple to implement and provides significant file size savings when used in the described methodology.

3) Random Blocking Boundaries for Folded DCT.

A typical imaging condition for RTM is expressed as in Equation (4a):

$$I(z,x,y)=\Sigma_s\Sigma_t S(z,x,y,t)*R(z,x,y,t) \quad (4a),$$

where I is the final image, S and R are 3D source and receiver wavefield snapshots, respectively, and the summation $\Sigma_s$ and $\Sigma_t$ represent seismic shots and time steps, respectively. Although not annotated explicitly, both S and R depend on a source location. In other words, the number of 3D source or receiver wavefield snapshots equals the product of the number of seismic shots and the number of time steps. Typically, this resultant number is around a value of one million. Taking into account data compression and decompression of the source wavefields, the RTM imaging condition for use with seismic wavefield data becomes, as expressed in Equation (4b):

$$I(z,x,y)=\Sigma_s\Sigma_t C^{-i}[C[S(z,x,y,t)]]*R(z,x,y,t) \quad (4b),$$

where C and $C^{-1}$ denote compression and decompression, respectively.

In Equations (4a) and (4b), a subsurface image is constructed by a cross-correlation of the source wavefield S and receiver wave field R. For each experiment and each time step, S and R would be 3D blocks. For a typical experiment, the memory size of 3D block S and R can be approximately 1 GB. Given 1000 time steps, S and R cannot be efficiently computed on-the-fly and one needs to be saved to a data storage location. In typical implementations of the described methodology, 3D block S is chosen for compression and storage. The key for the described methodology is Equations (5a) and (5b) (following), which are used to shift the input data in a 3D block in the z-direction (Equation (5a)) prior to compression and back in the z-direction for decompression (Equation (5b)). As shifting is random for each time step, any resultant noise at the boundary of a 3D block is randomly distributed. As Equations (4a) and (4b) provide summarization functionality for time and experiments, artifacts are further reduced.

Equations (4a) and (4b) illustrate the difference of the proposed 3D RTM image compression method compared to a conventional JPEG-like 3D data compression method. The difference is that a large number 3D source wavefields (for example, about 100,000) need to be compressed. If the same blocks for every source snapshot are used with a JPEG-like 3D data compression method, compression errors accumulate coherently and the resultant image I(z, x, y) becomes unacceptable.

Figure 5:
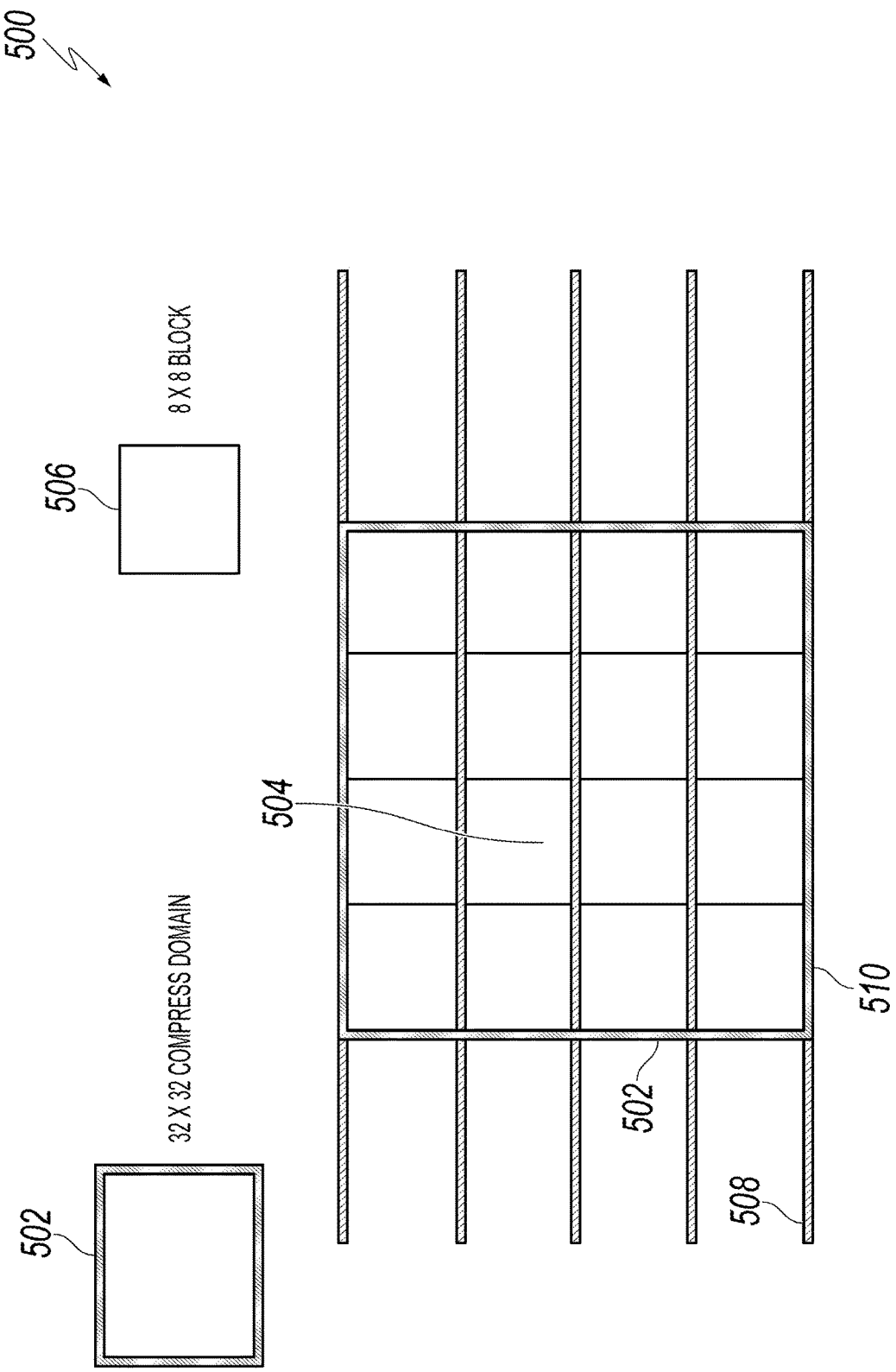
FIG. 5 is a block diagram illustrating an example image domain for a conventional compression method, according to an implementation of the present disclosure.

Referring to FIG. 5, FIG. 5 is a block diagram 500 illustrating an example image domain for a conventional compression method, according to an implementation of the present disclosure. In block diagram 500, image compression domain indicator 502 (here delimiting a 32*32 pixel image domain for compression) surrounds the image that has (as previously described) been decomposed into sixteen 8*8 pixel blocks 506. Note that, unlike FIG. 4, FIG. 5 is illustrated in two-dimensions (2D) for ease of understanding. Those of ordinary skill in the art will understand that the described principles can be translated to additional dimensioned data blocks (such as, a 3D block 402 as in FIG. 4). If conventional image compression method (for example, the previously described conventional JPEG compression method) is applied to each of the 8*8 blocks 506, artifacts would manifest at boundaries 508 (which is consistent with actual boundaries 510 of the 8*8 blocks 506). Summing the artifacts would emphasize the artifacts in a reconstituted image.

The proposed solution is to randomize blocking locations by using a randomly shifting temporary variable $S_{pad}$ before compression, where the random shift is determined using Equation (5a):

$$S_{pad}(iz+ir,ix,iy)=S(iz,ix,iy) \quad (5a),$$

and after decompression using Equation (5b):

$$S(iz,ix,iy)=S_{pad}(iz+ir,ix,iy) \quad (5b),$$

where ir is a randomly generated integer between 0 and 7 for each seismic shot and time slice.

As previously stated, the input data is randomly shifted in the z direction prior to compression. For example, for each decompressed 3D pixel block, any artifacts at the block boundary would then be randomly distributed and the imaging condition of Equation (4b) would sum up the decompressed data, which would further reduce the artifacts at the boundary.

Figure 6:
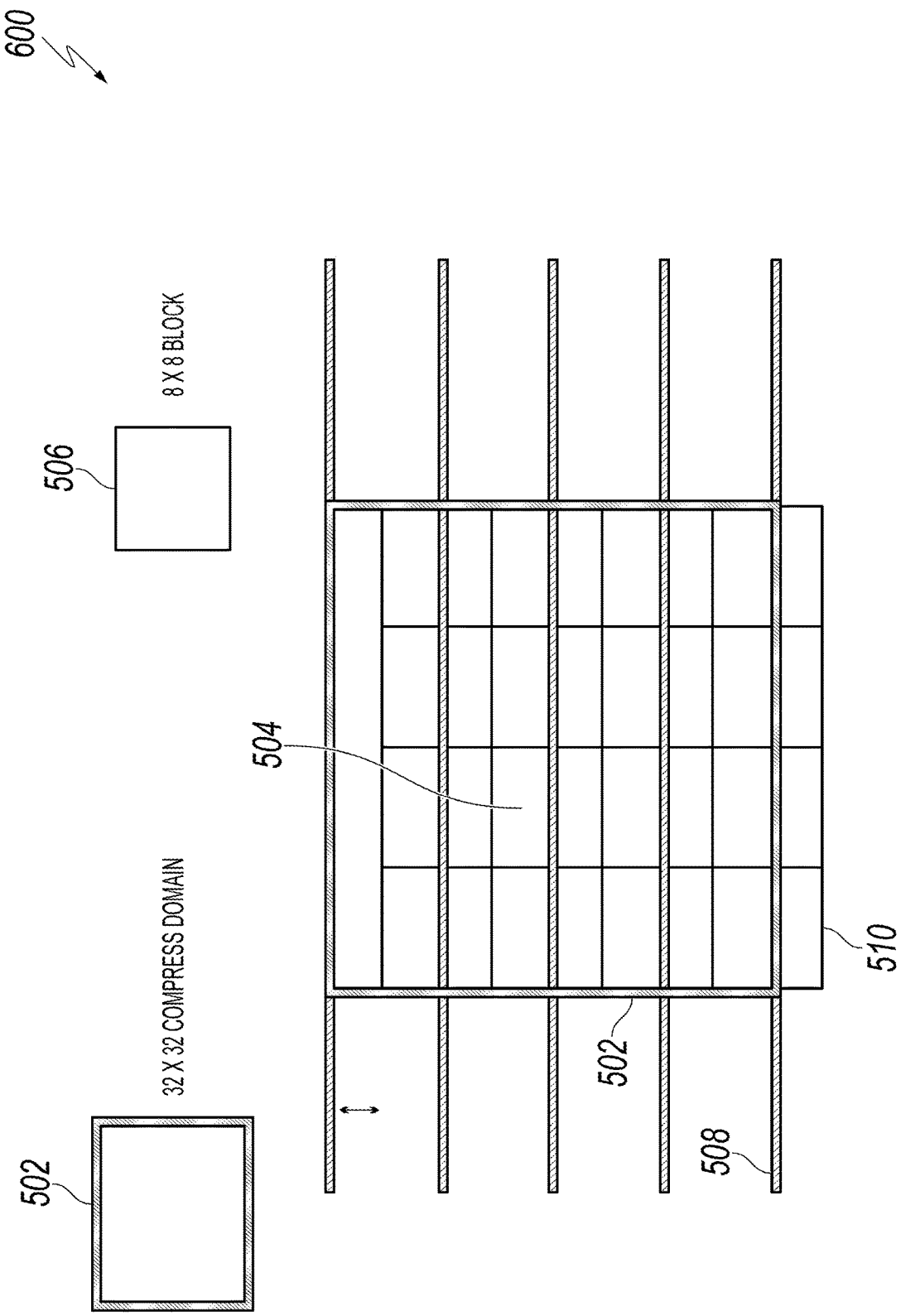
FIG. 6 is a block diagram illustrating an example image domain with randomly shifted 8*8 block data boundaries, according to an implementation of the present disclosure.

Continuing the example of FIG. 5 and referring to FIG. 6, FIG. 6 is a block diagram 600 illustrating an example image domain with randomly shifted 8*8 block 506 data boundaries 508, according to an implementation of the present disclosure. In block diagram 600, image compression domain indicator 502 (here, delimiting the same 32*32 pixel image domain for compression of FIG. 5) surrounds the image that has, as previously described, been decomposed into sixteen 8*8 pixel blocks 506. Similar to FIG. 5, FIG. 6 is again illustrated in 2D for ease of understanding. FIG. 6 illustrates that the data for each 8*8 block 506 is shifted vertically (a random shift value 602) prior to application of compression algorithms. Although the same type of artifacts would still occur at boundaries 508 (now shifted), due to the vertical shift of boundaries 508, the artifacts occur at a different location than at the original 8*8 block 506 boundaries 510 (as in FIG. 5). If different random shift values are chosen (so that random shift 602 varies) and the resultant artifacts summed when reconstituting the image 504, the summed up artifacts would cancel each other to produce a clearer final image.

From Equations (5a) and (5b), it is clear that with a random ir value, block boundaries change for each 3D pixel block and artifacts will not accumulate. The final 3D RTM seismic output image I(z, x, y) (for example, as illustrated in FIG. 3) is acceptable for seismic study use.

Figure 7:
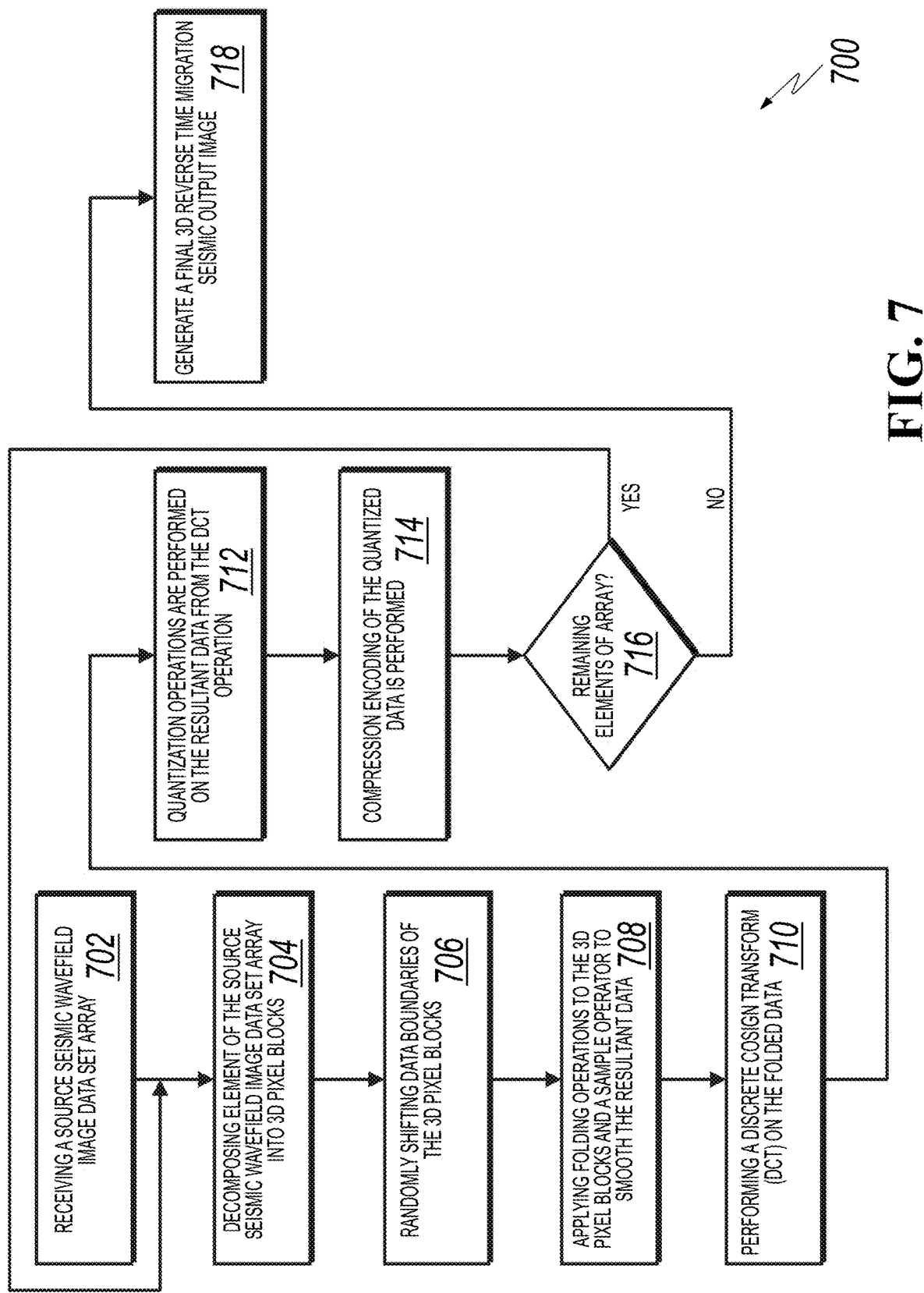
FIG. 7 is a flowchart illustrating an example method for compressing seismic data, according to an implementation of the present disclosure.

FIG. 7 is a flowchart illustrating an example method 700 for compressing seismic data, according to an implementation of the present disclosure. For clarity of presentation, the description that follows generally describes method 700 in the context of the other figures in this description. However, it will be understood that method 700 may be performed, for example, by any suitable system, environment, software, and hardware, or a combination of systems, environments, software, and hardware as appropriate. In some implementations, various steps of method 700 can be run in parallel, in combination, in loops, or in any order.

At 702, a source seismic wavefield image data set array is received for processing. From 702, method 700 proceeds to 704.

At 704, each element of the received data set array is iteratively decomposed into a set of 3D pixel blocks. From 704, method 700 proceeds to 706.

At 706, perform random shifting of the boundaries of the 3D pixel blocks. In a typical implementation, Equation (5a) is used for this purpose. From 706, method 700 proceeds to 708.

At 708, folding operations are applied to the 3D pixel blocks to prevent 3D pixel block overlap and a sample operator is applied to smooth the resultant data. In a typical implementation, Equation (2a) is used for this purpose. From 708, method 700 proceeds to 710.

At 710, DCT is performed on the folded data. In a typical implementation, Equation (1a) is used for this purpose. From 710, method 700 proceeds to 712.

At 712, quantization operations are performed on the resultant data from the DCT operation. In a typical implementation, Equation (3a) is used for this purpose. From 712, method 700 proceeds to 714.

At 714, compression encoding of the quantized data is performed. In typical implementations, Huffman encoding can be used for this purpose. Following compression encoding of all elements of the received source seismic wavefield image data set array, the final compressed source seismic wavefield image can be stored (for example, in computational memory or in a computer data storage location) for efficient processing. From 714, method 700 proceeds to 716.

At 716, a determination is made as to whether additional time-based elements of the source seismic wavefield image data set exist in the array for compression. If it is determined that additional elements exist, method 700 proceeds back to 704 to process the next element in the array. If it is determined that additional elements do not exist, method 700 proceeds to 718. Note, following the loop following 702 represented by 704-714, the compression phase of the source seismic wavefield image in complete. Decompression of the compressed source seismic wavefield image could be performed by reversing the operations of 702-716.

At 718, the compressed source seismic wavefield image data set is decompressed when computing a received receiver seismic wavefield (as previously described) by using the imaging condition of Equation (4b) to generate the final 3D RTM seismic output image (for example, as in FIG. 3). After 718, method 700 stops.

Figure 8:
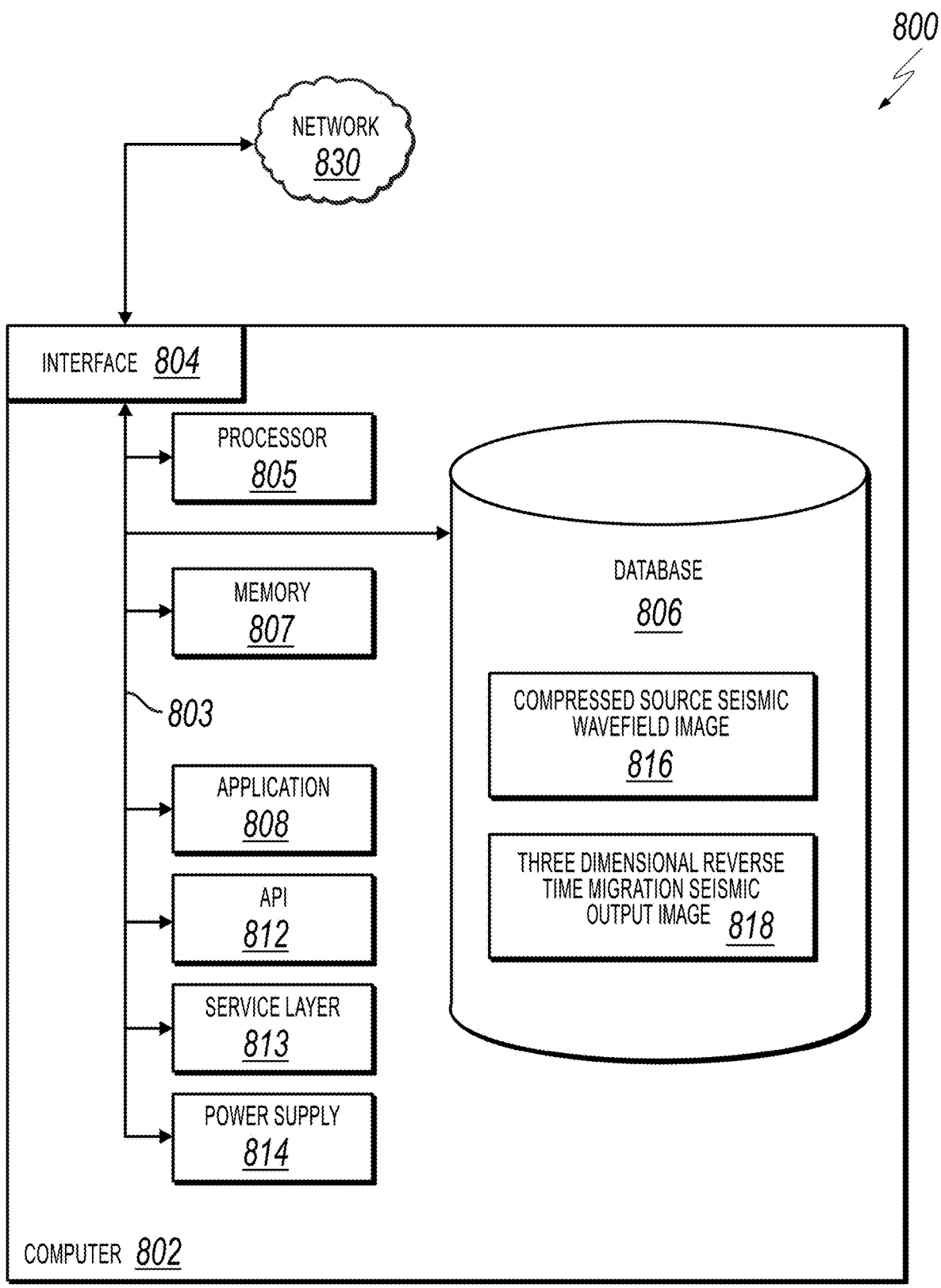
FIG. 8 is a block diagram illustrating an exemplary computer system used to provide computational functionalities associated with described algorithms, methods, functions, processes, flows, and procedures as described in the instant disclosure, according to an implementation of the present disclosure.

FIG. 8 is a block diagram illustrating an example of a computer-implemented System 800 used to provide computational functionalities associated with described algorithms, methods, functions, processes, flows, and procedures, according to an implementation of the present disclosure of the present disclosure. In the illustrated implementation, System 800 includes a Computer 802 and a Network 830.

The illustrated Computer 802 is intended to encompass any computing device, such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 802 can include an input device, such as a keypad, keyboard, touch screen, another input device, or a combination of input devices that can accept user information, and an output device that conveys information associated with the operation of the Computer 802, including digital data, visual, audio, another type of information, or a combination of types of information, on a graphical-type user interface (UI) (or GUI) or other UI. For example, in some implementations, the illustrated output images (such as, FIGS. 1-3) or other GUIs (not illustrated) associated with the illustrated output images (or other functionality consistent with this disclosure) can be interactive in nature and permit user actions to be performed (such as, triggering messages or requests for data to change, modify, or enhance the output images or to perform actions based on displayed data).

The Computer 802 can serve in a role in a distributed computing system as a client, network component, a server, a database or another persistency, another role, or a combination of roles for performing the subject matter described in the present disclosure. The illustrated Computer 802 is communicably coupled with a Network 830. In some implementations, one or more components of the Computer 802 can be configured to operate within an environment, including cloud-computing-based, local, global, another environment, or a combination of environments.

At a high level, the Computer 802 is an electronic computing device operable to receive, transmit, process, store, or manage data and information associated with the described subject matter. According to some implementations, the Computer 802 can also include or be communicably coupled with a server, including an application server, e-mail server, web server, caching server, streaming data server, another server, or a combination of servers.

The Computer 802 can receive requests over Network 830 (for example, from a client software application executing on another Computer 802) and respond to the received requests by processing the received requests using a software application or a combination of software applications. In addition, requests can also be sent to the Computer 802 from internal users (for example, from a command console or by another internal access method), external or third-parties, or other entities, individuals, systems, or computers.

Each of the components of the Computer 802 can communicate using a System Bus 803. In some implementations, any or all of the components of the Computer 802, including hardware, software, or a combination of hardware and software, can interface over the System Bus 803 using an application programming interface (API) 812, a Service Layer 813, or a combination of the API 812 and Service Layer 813. The API 812 can include specifications for routines, data structures, and object classes. The API 812 can be either computer-language independent or dependent and refer to a complete interface, a single function, or even a set of APIs. The Service Layer 813 provides software services to the Computer 802 or other components (whether illustrated or not) that are communicably coupled to the Computer 802. The functionality of the Computer 802 can be accessible for all service consumers using the Service Layer 813. Software services, such as those provided by the Service Layer 813, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 802, alternative implementations can illustrate the API 812 or the Service Layer 813 as stand-alone components in relation to other components of the Computer 802 or other components (whether illustrated or not) that are communicably coupled to the Computer 802. Moreover, any or all parts of the API 812 or the Service Layer 813 can be implemented as a child or a sub-module of another software module, enterprise application, or hardware module without departing from the scope of the present disclosure.

The Computer 802 includes an Interface 804. Although illustrated as a single Interface 804, two or more Interfaces 804 can be used according to particular needs, desires, or particular implementations of the Computer 802. The Interface 804 is used by the Computer 802 for communicating with another computing system (whether illustrated or not) that is communicatively linked to the Network 830 in a distributed environment. Generally, the Interface 804 is operable to communicate with the Network 830 and includes logic encoded in software, hardware, or a combination of software and hardware. More specifically, the Interface 804 can include software supporting one or more communication protocols associated with communications such that the Network 830 or hardware of Interface 804 is operable to communicate physical signals within and outside of the illustrated Computer 802.

The Computer 802 includes a Processor 805. Although illustrated as a single Processor 805, two or more Processors 805 can be used according to particular needs, desires, or particular implementations of the Computer 802. Generally, the Processor 805 executes instructions and manipulates data to perform the operations of the Computer 802 and any algorithms, methods, functions, processes, flows, and procedures as described in the present disclosure.

The Computer 802 also includes a Database 806 that can hold data for the Computer 802, another component communicatively linked to the Network 830 (whether illustrated or not), or a combination of the Computer 802 and another component. For example, Database 806 can be an in-memory, conventional, or another type of database storing data consistent with the present disclosure. In some implementations, Database 806 can be a combination of two or more different database types (for example, a hybrid in-memory and conventional database) according to particular needs, desires, or particular implementations of the Computer 802 and the described functionality. Although illustrated as a single Database 806, two or more databases of similar or differing types can be used according to particular needs, desires, or particular implementations of the Computer 802 and the described functionality. While Database 806 is illustrated as an integral component of the Computer 802, in alternative implementations, Database 806 can be external to the Computer 802. As illustrated, the database 806 holds a compressed source seismic wavefield image 816 and a 3D RTM seismic output image 818, as previously described.

The Computer 802 also includes a Memory 807 that can hold data for the Computer 802, another component or components communicatively linked to the Network 830 (whether illustrated or not), or a combination of the Computer 802 and another component. Memory 807 can store any data consistent with the present disclosure. In some implementations, Memory 807 can be a combination of two or more different types of memory (for example, a combination of semiconductor and magnetic storage) according to particular needs, desires, or particular implementations of the Computer 802 and the described functionality. Although illustrated as a single Memory 807, two or more Memories 807 or similar or differing types can be used according to particular needs, desires, or particular implementations of the Computer 802 and the described functionality. While Memory 807 is illustrated as an integral component of the Computer 802, in alternative implementations, Memory 807 can be external to the Computer 802.

The Application 808 is an algorithmic software engine providing functionality according to particular needs, desires, or particular implementations of the Computer 802, particularly with respect to functionality described in the present disclosure. For example, Application 808 can serve as one or more components, modules, or applications. Further, although illustrated as a single Application 808, the Application 808 can be implemented as multiple Applications 808 on the Computer 802. In addition, although illustrated as integral to the Computer 802, in alternative implementations, the Application 808 can be external to the Computer 802.

The Computer 802 can also include a Power Supply 814. The Power Supply 814 can include a rechargeable or non-rechargeable battery that can be configured to be either user- or non-user-replaceable. In some implementations, the Power Supply 814 can include power-conversion or management circuits (including recharging, standby, or another power management functionality). In some implementations, the Power Supply 814 can include a power plug to allow the Computer 802 to be plugged into a wall socket or another power source to, for example, power the Computer 802 or recharge a rechargeable battery.

There can be any number of Computers 802 associated with, or external to, a computer system containing Computer 802, each Computer 802 communicating over Network 830. Further, the term "client," "user," or other appropriate terminology can be used interchangeably, as appropriate, without departing from the scope of the present disclosure. Moreover, the present disclosure contemplates that many users can use one Computer 802, or that one user can use multiple computers 802.

In some implementations, the described methodology can be configured to send messages, instructions, or other communications to a computer-implemented controller, database, or other computer-implemented system to dynamically initiate control of, control, or cause another computer-implemented system to perform a computer-implemented or other function/operation. For example, operations based on data, operations, outputs, or interaction with a GUI can be transmitted to cause operations associated with a computer, database, network, or other computer-based system to perform storage efficiency, data retrieval, or other operations consistent with this disclosure. In another example, interacting with any illustrated GUI can automatically result in one or more instructions transmitted from the GUI to trigger requests for data, storage of data, analysis of data, or other operations consistent with this disclosure.

In some instances, transmitted instructions can result in control, operation, modification, enhancement, or other operations with respect to a tangible, real-world piece of computing or other equipment. For example, the described GUIs can send a request to slow or speed up a computer database magnetic/optical disk drive, activate/deactivate a computing system, cause a network interface device to disable, throttle, or increase data bandwidth allowed across a network connection, or sound an audible/visual alarm (such as, a mechanical alarm/light emitting device) as a notification of a result, behavior, determination, or analysis with respect to a computing system(s) associated with the described methodology or interacting with the computing system(s) associated with the described methodology.

In some implementations, the output of the described methodology can be used to dynamically influence, direct, control, influence, or manage tangible, real-world equipment related to hydrocarbon production, analysis, and recovery or for other purposes consistent with this disclosure. For example, data relating to compressed seismic data can be used to enhance quality of produced 2D/3D seismic/structural images or for use in other analytical/predictive processes. As another example, the data relating to compression of seismic data can be used to modify a wellbore trajectory, increase/decrease speed of or stop/start a hydrocarbon drill; activate/deactivate an alarm (such as, a visual, auditory, or voice alarm), or to affect refinery or pumping operations (for example, stop, restart, accelerate, or reduce). Other examples can include alerting geo-steering and directional drilling staff when underground obstacles have been detected (such as, with a visual, auditory, or voice alarm). In some implementations, the described methodology can be integrated as part of a dynamic computer-implemented control system to control, influence, or use with any hydrocarbon-related or other tangible, real-world equipment consistent with this disclosure.

Described implementations of the subject matter can include one or more features, alone or in combination.

For example, in a first implementation, a computer-implemented method, comprising: dividing a three-dimensional (3D) seismic data set into a plurality of 3D source wavefield subsets, each 3D source wavefield subset stored in an array element of an array; for each array element: decomposing the associated 3D source wavefield into a smaller data unit; randomly shifting data boundaries of the smaller data units; applying a folding operation and a sample operator to the smaller data units to keep the smaller data units from overlapping; smoothing the folded smaller data units to generate smoothed data; performing a quantization operation on the smoothed data to produce quantized data; and compression encoding the quantized data to generate compressed data; and decompressing the compressed data associated with each array element to generate a 3D seismic output image.

The foregoing and other described implementations can each optionally include one or more of the following features:

A first feature, combinable with any of the following features, wherein the array is indexed using one of time, geographic location, and depth.

A second feature, combinable with any of the previous or following features, wherein the smaller data unit is an M*M*M block, where M is a dimensional size of the block in pixels.

A third feature, combinable with any of the previous or following features, wherein decomposing the associated 3D source wavefield into the smaller data unit includes using a forward Discrete Cosine Transform (DCT):

$$Z(k) = \sum_{j=0}^{M-1} y(j)b(j)\sqrt{\frac{2}{M}} \cos\left[\frac{\pi(2k+1)j}{2M}\right],$$

where k=0, 1, . . . , M−1, y is the array, Z represents forward DCT coefficients, and b is:

$$b(j) = \begin{cases} \frac{1}{\sqrt{2}}, & j = 0 \\ 1, & \text{otherwise} \end{cases},$$

and
where j=0, 1, . . . , M−1 and M is a dimensional size of the blocks in pixels.

A fourth feature, combinable with any of the previous or following features, wherein the data boundaries for each block are shifted in the z coordinate direction using temporary shifting variable $S_{pad}$:

$$S_{pad}(iz+ir,ix,iy)=S(iz,ix,iy),$$

where ir is a randomly generated integer between 0 and M−1, inclusive.

A fifth feature, combinable with any of the previous or following features, wherein the smoothing is performed using a performing a forward Discrete Cosine Transform (DCT).

A sixth feature, combinable with any of the previous or following features, wherein the compression encoding is performed using Huffman encoding.

In a second implementation, a non-transitory, computer-readable medium storing one or more instructions executable by a computer system to perform operations comprising: dividing a three-dimensional (3D) seismic data set into a plurality of 3D source wavefield subsets, each 3D source wavefield subset stored in an array element of an array; for each array element: decomposing the associated 3D source wavefield into a smaller data unit; randomly shifting data boundaries of the smaller data units; applying a folding operation and a sample operator to the smaller data units to keep the smaller data units from overlapping; smoothing the folded smaller data units to generate smoothed data; performing a quantization operation on the smoothed data to produce quantized data; and compression encoding the quantized data to generate compressed data; and decompressing the compressed data associated with each array element to generate a 3D seismic output image.

The foregoing and other described implementations can each optionally include one or more of the following features:

A first feature, combinable with any of the following features, wherein the array is indexed using one of time, geographic location, and depth.

A second feature, combinable with any of the previous or following features, wherein the smaller data unit is an M*M*M block, where M is a dimensional size of the block in pixels.

A third feature, combinable with any of the previous or following features, wherein decomposing the associated 3D source wavefield into the smaller data unit includes using a forward Discrete Cosine Transform (DCT):

$$Z(k) = \sum_{j=0}^{M-1} y(j)b(j)\sqrt{\frac{2}{M}} \cos\left[\frac{\pi(2k+1)j}{2M}\right],$$

where k=0, 1, . . . , M−1, y is the array, Z represents forward DCT coefficients, and b is:

$$b(j) = \begin{cases} \frac{1}{\sqrt{2}}, & j = 0 \\ 1, & \text{otherwise} \end{cases},$$

and
where j=0, 1, . . . , M−1 and M is a dimensional size of the blocks in pixels.

A fourth feature, combinable with any of the previous or following features, wherein the data boundaries for each block are shifted in the z coordinate direction using temporary shifting variable $S_{pad}$:

$$S_{pad}(iz+ir,ix,iy)=S(iz,ix,iy),$$

where ir is a randomly generated integer between 0 and M−1, inclusive.

A fifth feature, combinable with any of the previous or following features, wherein the smoothing is performed using a performing a forward Discrete Cosine Transform (DCT).

A sixth feature, combinable with any of the previous or following features, wherein the compression encoding is performed using Huffman encoding.

In a third implementation, a computer-implemented system, comprising: a computer memory; and a hardware processor interoperably coupled with the computer memory and configured to perform operations comprising: dividing a three-dimensional (3D) seismic data set into a plurality of 3D source wavefield subsets, each 3D source wavefield subset stored in an array element of an array; for each array element: decomposing the associated 3D source wavefield into a smaller data unit; randomly shifting data boundaries of the smaller data units; applying a folding operation and a sample operator to the smaller data units to keep the smaller data units from overlapping; smoothing the folded smaller data units to generate smoothed data; performing a quantization operation on the smoothed data to produce quantized data; and compression encoding the quantized data to generate compressed data; and decompressing the compressed data associated with each array element to generate a 3D seismic output image.

The foregoing and other described implementations can each optionally include one or more of the following features:

A first feature, combinable with any of the following features, wherein the array is indexed using one of time, geographic location, and depth.

A second feature, combinable with any of the previous or following features, wherein the smaller data unit is an M*M*M block, where M is a dimensional size of the block in pixels.

A third feature, combinable with any of the previous or following features, wherein decomposing the associated 3D source wavefield into the smaller data unit includes using a forward Discrete Cosine Transform (DCT):

$$Z(k) = \sum_{j=0}^{M-1} y(j)b(j)\sqrt{\frac{2}{M}} \cos\left[\frac{\pi(2k+1)j}{2M}\right],$$

where k=0, 1, ..., M−1, y is the array, Z represents forward DCT coefficients, and b is:

$$b(j) = \begin{cases} \frac{1}{\sqrt{2}}, & j = 0 \\ 1, & \text{otherwise} \end{cases},$$

and
where j=0, 1, ..., M−1 and M is a dimensional size of the blocks in pixels.

A fourth feature, combinable with any of the previous or following features, wherein the data boundaries for each block are shifted in the z coordinate direction using temporary shifting variable $S_{pad}$:

$$S_{pad}(iz+ir,ix,iy)=S(iz,ix,iy),$$

where ir is a randomly generated integer between 0 and M−1, inclusive.

A fifth feature, combinable with any of the previous or following features, wherein the smoothing is performed using a performing a forward Discrete Cosine Transform (DCT).

A sixth feature, combinable with any of the previous or following features, wherein the compression encoding is performed using Huffman encoding.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special purpose logic circuitry, for example, a central processing unit (CPU), a field programmable gate array (FPGA), or an application-specific integrated circuit (ASIC). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    dividing a three-dimensional (3D) seismic data set into a plurality of 3D source wavefield subsets, each 3D source wavefield subset stored in an array element of an array;
    for each array element:
        decomposing the associated 3D source wavefield into a smaller data unit;
        randomly shifting data boundaries of the smaller data units;
        applying a folding operation and a sample operator to the smaller data units to keep the smaller data units from overlapping;
        smoothing the folded smaller data units to generate smoothed data;
        performing a quantization operation on the smoothed data to produce quantized data; and
        compression encoding the quantized data to generate compressed data; and
    decompressing the compressed data associated with each array element to generate a 3D seismic output image, wherein dimensions of the 3D seismic output image include a depth dimension, a line dimension, and a common depth point (CDP) dimension, wherein the line dimension represents lines of geophones recording reflections of seismic energy transmitted into the earth, and wherein the line dimension identifies, in the 3D seismic output image, a specific geophone recording the reflection at a given depth and CDP.

2. The computer-implemented method of claim 1, wherein the array is indexed using one of time, geographic location, and depth.

3. The computer-implemented method of claim 1, wherein the smaller data unit is an M*M*M block, where M is a dimensional size of the block in pixels.

4. The computer-implemented method of claim 1, wherein decomposing the associated 3D source wavefield into the smaller data unit includes using a forward Discrete Cosine Transform (DCT):

$$Z(k) = \sum_{j=0}^{M-1} y(j)b(j)\sqrt{\frac{2}{M}} \cos\left[\frac{\pi(2k+1)j}{2M}\right],$$

where k=0, 1, . . . , M−1, y is the array, Z represents forward DCT coefficients, and b is:

$$b(j) = \begin{cases} \frac{1}{\sqrt{2}}, & j=0 \\ 1, & \text{otherwise} \end{cases},$$

and
where j=0, 1, . . . , M−1 and M is a dimensional size of the blocks in pixels.

5. The computer-implemented method of claim 1, wherein the data boundaries for each block are shifted in the z coordinate direction using temporary shifting variable $S_{pad}$:

$$S_{pad}(iz+ir,ix,iy)=S(iz,ix,iy),$$

where ir is a randomly generated integer between 0 and M−1, inclusive.

6. The computer-implemented method of claim 1, wherein the smoothing is performed using a forward Discrete Cosine Transform (DCT).

7. The computer-implemented method of claim 1, wherein the compression encoding is performed using Huffman encoding.

8. A non-transitory, computer-readable medium storing one or more instructions executable by a computer system to perform operations comprising:
    dividing a three-dimensional (3D) seismic data set into a plurality of 3D source wavefield subsets, each 3D source wavefield subset stored in an array element of an array;
    for each array element:
        decomposing the associated 3D source wavefield into a smaller data unit;
        randomly shifting data boundaries of the smaller data units;
        applying a folding operation and a sample operator to the smaller data units to keep the smaller data units from overlapping;
        smoothing the folded smaller data units to generate smoothed data;

performing a quantization operation on the smoothed data to produce quantized data; and compression encoding the quantized data to generate compressed data; and decompressing the compressed data associated with each array element to generate a 3D seismic output image, wherein dimensions of the 3D seismic output image include a depth dimension, a line dimension, and a common depth point (CDP) dimension, wherein the line dimension represents lines of geophones recording reflections of seismic energy transmitted into the earth, and wherein the line dimension identifies, in the 3D seismic output image, a specific geophone recording the reflection at a given depth and CDP.

9. The non-transitory, computer-readable medium of claim 8, wherein the array is indexed using one of time, geographic location, and depth.

10. The non-transitory, computer-readable medium of claim 8, wherein the smaller data unit is an M*M*M block, where M is a dimensional size of the block in pixels.

11. The non-transitory, computer-readable medium of claim 8, wherein decomposing the associated 3D source wavefield into the smaller data unit includes using a forward Discrete Cosine Transform (DCT):

$$Z(k) = \sum_{j=0}^{M-1} y(j)b(j)\sqrt{\frac{2}{M}} \cos\left[\frac{\pi(2k+1)j}{2M}\right],$$

where k=0, 1, . . . , M−1, y is the array, Z represents forward DCT coefficients, and b is:

$$b(j) = \begin{cases} \frac{1}{\sqrt{2}}, & j=0 \\ 1, & \text{otherwise} \end{cases},$$

and
where j=0, 1, . . . , M−1 and M is a dimensional size of the blocks in pixels.

12. The non-transitory, computer-readable medium of claim 8, wherein the data boundaries for each block are shifted in the z coordinate direction using temporary shifting variable $S_{pad}$:

$$S_{pad}(iz+ir,ix,iy)=S(iz,ix,iy),$$

where ir is a randomly generated integer between 0 and M−1, inclusive.

13. The non-transitory, computer-readable medium of claim 8, wherein the smoothing is performed using a forward Discrete Cosine Transform (DCT).

14. The non-transitory, computer-readable medium of claim 8, wherein the compression encoding is performed using Huffman encoding.

15. A computer-implemented system, comprising:
a computer memory; and
a hardware processor interoperably coupled with the computer memory and configured to perform operations comprising:
dividing a three-dimensional (3D) seismic data set into a plurality of 3D source wavefield subsets, each 3D source wavefield subset stored in an array element of an array;
for each array element:
decomposing the associated 3D source wavefield into a smaller data unit;
randomly shifting data boundaries of the smaller data units;
applying a folding operation and a sample operator to the smaller data units to keep the smaller data units from overlapping;
smoothing the folded smaller data units to generate smoothed data;
performing a quantization operation on the smoothed data to produce quantized data; and
compression encoding the quantized data to generate compressed data; and
decompressing the compressed data associated with each array element to generate a 3D seismic output image, wherein dimensions of the 3D seismic output image include a depth dimension, a line dimension, and a common depth point (CDP) dimension, wherein the line dimension represents lines of geophones recording reflections of seismic energy transmitted into the earth, and wherein the line dimension identifies, in the 3D seismic output image, a specific geophone recording the reflection at a given depth and CDP.

16. The computer-implemented system of claim 15, wherein the array is indexed using one of time, geographic location, and depth.

17. The computer-implemented system of claim 15, wherein the smaller data unit is an M*M*M block, where M is a dimensional size of the block in pixels.

18. The computer-implemented system of claim 15, wherein decomposing the associated 3D source wavefield into the smaller data unit includes using a forward Discrete Cosine Transform (DCT):

$$Z(k) = \sum_{j=0}^{M-1} y(j)b(j)\sqrt{\frac{2}{M}} \cos\left[\frac{\pi(2k+1)j}{2M}\right],$$

where k=0, 1, . . . , M−1, y is the array, Z represents forward DCT coefficients, and b is:

$$b(j) = \begin{cases} \frac{1}{\sqrt{2}}, & j=0 \\ 1, & \text{otherwise} \end{cases},$$

and
where j=0, 1, . . . , M−1 and M is a dimensional size of the blocks in pixels.

19. The computer-implemented system of claim 15, wherein the data boundaries for each block are shifted in the z coordinate direction using temporary shifting variable $S_{pad}$:

$$S_{pad}(iz+ir,ix,iy)=S(iz,ix,iy),$$

where ir is a randomly generated integer between 0 and M−1, inclusive.

20. The computer-implemented system of claim 15, wherein the smoothing is performed using a forward Discrete Cosine Transform (DCT) and the compression encoding is performed using Huffman encoding.

* * * * *

UNITED STATES PATENT AND TRADEMARK OFFICE
CERTIFICATE OF CORRECTION

PATENT NO. : 11,016,212 B2
APPLICATION NO. : 15/949826
DATED : May 25, 2021
INVENTOR(S) : Sun et al.

Page 1 of 1

It is certified that error appears in the above-identified patent and that said Letters Patent is hereby corrected as shown below:

On the Title Page

Item (56) OTHER PUBLICATIONS, Line 2, delete "impage" and insert -- image --.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*